United States Patent Office 2,915,024
Patented Dec. 1, 1959

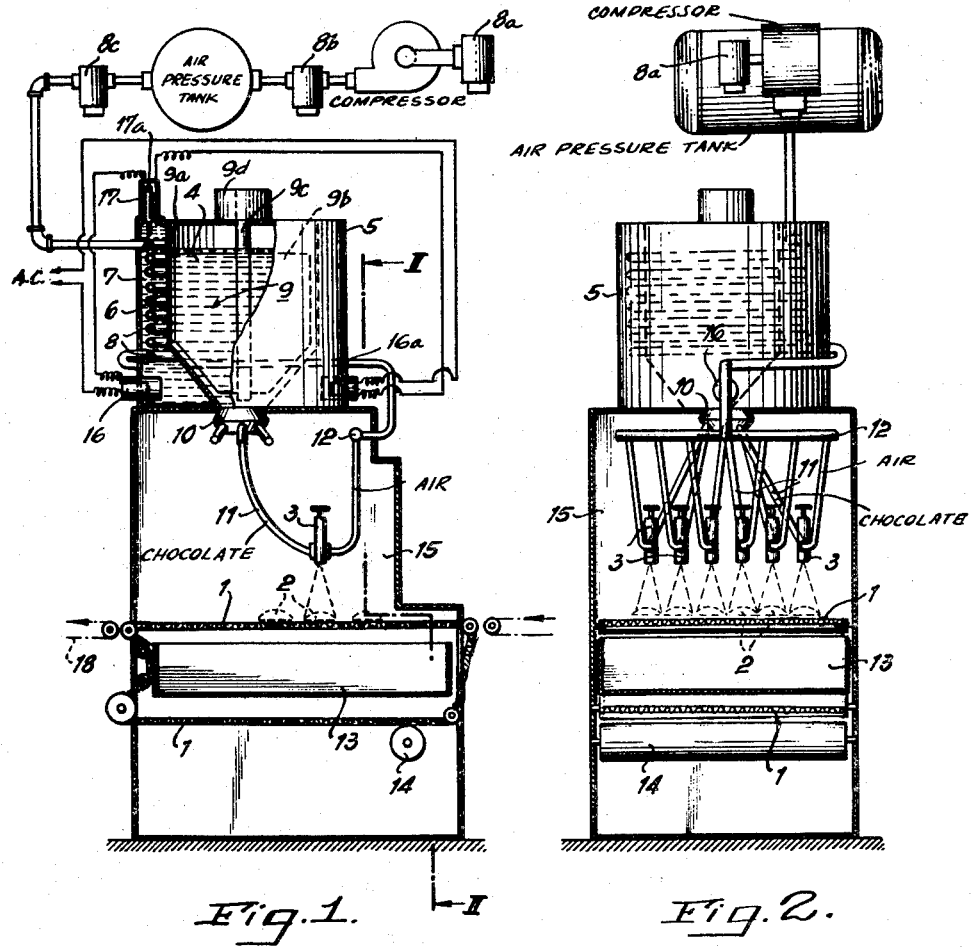

2,915,024
PROCESS AND MACHINE FOR COATING ARTICLES WITH CHOCOLATE OR THE LIKE

Otto Krüger and Wolf Stratmann, Bielefeld, Germany, assignors, by mesne assignments, to National Biscuit Company, New York, N.Y.

Application May 3, 1954, Serial No. 427,020

10 Claims. (Cl. 107—54)

The invention relates to a process and to a machine necessary for carrying out the process of coating articles, such as baker's ware or pastry, with chocolate or the like.

Processes and machines for coating pastry with chocolate are known, whereby the coating material is poured in liquid state on to the bodies moving on an endless grid band. The coating material is first brought to the desired temperature and conveyed from a storage container into a distributor channel by means of a disk wheel, worm or pump and from this channel is poured onto the articles. The excess coating material on the articles is blown down to the desired thickness with the aid of an air current. The process has a number of objections which are avoided by the process according to the invention.

According to the process forming the subject matter of the invention the articles are coated with chocolate by spraying the coating material through nozzles with the aid of compressed air. The required thickness of the coating on the articles or the percentage weight component of the coating is regulated by suitably adapting the spraying process. For example, the number, type and arrangement of the spraying nozzles can be chosen to suit the case in question.

The coating material is heated to the maximum temperature, for example 32° C., before spraying. The heating is preferably carried out with continual stirring in a double-walled container which accommodates a thermostatically regulated water bath in the double wall.

The compressed air before entering the spraying nozzles is cleansed in several stages and brought to the temperature of the coating material to be sprayed by passing through a copper coil submerged in the thermostatically regulated water bath.

The articles to be coated are conveyed on an endless grid band or belt under the spraying nozzles and then into a cooling passage. The endless grid band is made of wire fabric and continually cleaned by means of a rubber roller arranged under it. The surplus coating material is caught and collected in a container arranged below the endless grid band.

The spraying operation itself is carried out in a closed tempered spraying compartment.

The process according to the invention also permits the partial coating of for example flat articles, in that one article partly covers the next following article and so forth on the endless grid band. It is also possible according to this process to produce coatings on a mixed collection of articles. Thus for example mixtures of different kinds of baker's ware can be coated with chocolate side by side and simultaneously in a continuous operation.

Due to the peculiarity of the spraying process other advantages are attained by the fact that the proportion of coating material, for example 10% in the case of non-perishable goods, is sufficient for a complete covering, whereas according to the old process at least 15% was necessary. The wire grid band on which the articles rest is only soiled by a film of coating material, so that the articles scarcely come into contact with chocolate at all on their under sides.

A machine for carrying out the process is illustrated in the accompanying drawing, in which:

Fig. 1 is a diagrammatic vertical section through a machine for coating baker's ware or pastry with chocolate, and Fig. 2 is a vertical section taken along the line II—II of Fig. 1.

Over a grid band 1 conveying articles 2 for example vertical nozzles 3 are arranged. These nozzles are fed with coating material 4 from a raised container 5 and spray this material with the aid of compressed air.

This raised container 5 has a double walled water jacket 6 forming a heated water bath 7 in which compressed air is heated in copper coils 8. Coating material is heated by the hot water bath 7 in the surrounding double walled chamber 6 the inner wall of which forms a container 9a in which the coating material is uniformly mixed by a stirring mechanism 9. The stirring mechanism 9 comprises a paddle 9b fixed to a rotatable spindle 9c connected with a suitable power source 9d for rotation. A distributor head 10 for the coating material 4 is provided in the bottom of the container 5 and projects into a spraying chamber 15. This distributor head 10 feeds the coating material to the spraying nozzles 3 through, for example, six distributor tubes 11.

The necessary compressed air is sucked through a dust filter 8a into the compressor, is freed from oil and moisture in a second filter 8b on its way to the air pressure tank, is rendered odorless by a third filter 8c and then, after being preheated in the copper coils 8, is fed to the spraying nozzles 3 by the compressed air distributor 12.

The grid band 1, which conveys the articles under the spraying nozzles 3 and then into a cooling passage 18, is made for example of wire fabric. A container 13 is arranged thereunder for collecting the surplus coating. The grid band 1 is cleaned continually by one or more rubber rollers 14 arranged thereunder.

The spraying chamber 15 is closed. The required thickness of the coating on the wares or articles 2 or the percentage weight proportion of the coating is regulated by suitable adaptation of the spraying operation, for example by the selection of the number, type and arrangement of the spraying nozzles 3. The water bath 7 is heated for example by electric heating elements 16 and 16a which are electrically in circuit with the thermostat 17. A capillary tube 17a extending into the water bath activates the thermostat 17 which serves to maintain the heated water at constant temperature.

The triple filtration of the air necessary for spraying the chocolate makes it entirely free from dust and odor. The aroma, natural colour and consistency of the coating chocolate are therefore maintained entirely.

The temperatures mentioned are only examples. If the chocolate is heated to 32° C. and the purified compressed air to the same temperature the sprayed coating is given the desired special gloss for coating chocolate.

The desired thickness of the coating is not regulated as in the known process by being blown off, but solely by the number, type and arrangement of the nozzles and the speed of the machine.

While the process herein described, and the form of apparatus for carrying out this process into effect, constitute preferred embodiments of the invention, it is to be understood that the invention is not limited to this precise process and form of apparatus, and that changes may be made in either without departing from the scope of the invention which is defined in the appended claims.

We claim:
1. The process of spraying edible articles with a coat- ing material such as chocolate, which comprises the steps of heating the coating material to its optimum flowable temperature and then spraying the same onto said articles by the use of compressed air heated to a temperature substantially identical with that of the coating material.

2. The process set forth in claim 1, including the constant heating of the coating material in a temperature regulated water bath while said material is constantly stirred.

3. The process as set forth in claim 1, including the constant heating of the coating material and the compressed air in a temperature regulated water bath common to both of them.

4. The process as set forth in claim 1, including the step of moving the articles to be coated into and out of the path of the spray.

5. The process as set forth in claim 1, including the step of filtering the compressed air to remove dust, oil and odor impurities before it is used for spraying.

6. An apparatus for spraying edible articles with a coating material such as chocolate, comprising an endless grid conveyor band for supporting the articles to be coated, means supporting vertical spraying nozzles above said conveyor band, a raised container for holding a supply of the coating material, means for heating the coating material in said container to its optimum flowable temperature, coating material distributor means leading from the container to said spraying nozzles, a supply of heated compressed air, means for feeding the compressed air to the spraying nozzles to spray the coating material therefrom onto the articles on the conveyor, and means for heating and maintaining the temperature of the compressed air substantially identical with that of said coating material, said means including a thermostatically regulated water bath.

7. An apparatus as set forth in claim 6, wherein the means for heating the coating material in said raised container comprises a water bath compartment surrounding said container, and the compressed air feeding means includes a hollow copper tube disposed in and for conducting the compressed air through said water bath compartment.

8. An apparatus as set forth in claim 6, wherein the coating material distributing means comprises a distributor head and a plurality of distributor tubes leading from the distributor head to the spraying nozzles.

9. An apparatus as set forth in claim 6, wherein said grid conveyor band is made of wire fabric, and including a container for collecting excess sprayed coating material disposed under said grid conveyor band, and one or more rubber rollers rotatably mounted between said container and said conveyor band to roll in contact with said conveyor band and remove excess coating material therefrom.

10. An apparatus as set forth in claim 6, wherein said raised coating container is formed with a surrounding compartment containing a water bath, and including a thermostatically regulated heating element for heating the water bath and maintaining it at a predetermined temperature.

References Cited in the file of this patent
UNITED STATES PATENTS

| | | |
|---|---|---|
| 1,688,149 | Massarella | Oct. 16, 1928 |
| 1,725,608 | Zebulske | Aug. 20, 1929 |
| 2,101,240 | Cloud | Dec. 7, 1937 |
| 2,586,684 | McNamara | Feb. 19, 1952 |